Feb. 2, 1954  W. C. CARLTON  2,667,662
APPARATUS FOR MANUFACTURING PLASTIC SHUTTLECOCKS
Filed March 9, 1951

Inventor
William Charles Carlton
By John E. Eastluck
Attorney

Patented Feb. 2, 1954

2,667,662

UNITED STATES PATENT OFFICE 2,667,662

APPARATUS FOR MANUFACTURING PLASTIC SHUTTLECOCKS

William Charles Carlton, Hornchurch, England

Application March 9, 1951, Serial No. 214,759

Claims priority, application Great Britain February 19, 1951

7 Claims. (Cl. 18—42)

This invention relates to a method of and apparatus for plastic shuttlecocks.

It is known that an extremely light skirt is required for a good shuttlecock, and when a plastic shuttlecock is made by injection molding it is extremely difficult to obtain the required lightness combined with strength because of the reluctance of the material to run or flow in extremely small spaces. When material running from the two ends of a canal in a molding apparatus meets in the middle of the canal, an additional problem is created because a very small amount of air is trapped and this prevents a good joint or weld. Although this characteristic can be used to advantage in some features of shuttlecock manufacture, it is a disadvantage in others.

I have found that the required lightness in the skirt of a shuttlecock can be obtained in the injection molding process if the main stem passages carrying the material in fluid state in the molding apparatus are connected by a series of rib passages or canals placed reasonably close together, and that the strength of the joint which must be made in the center of these canals is increased if at least one subsidiary stem passage is provided between the main stem passages. In addition to acting as air escape lines, these subsidiary stem passages fill up with material and substantially increase the air resistance of the finished skirt without materially adding to the weight, and at the same time make it easier for the material to flow along the canals.

The primary object of the invention is to provide a molding apparatus adapted to produce a shuttlecock having a skirt of light weight and great strength.

A further object of the invention is to provide a molding apparatus as aforesaid designed to strengthen the joints which will occur in the mold canals.

A further object of the invention is to provide a molding apparatus as aforesaid in which the canals are designed to facilitate the removal from the apparatus of a molded shuttlecock as a complete unit.

Other objects of the invention may become apparent as the description proceeds.

In the specification, the main stem passages are feeding grooves in which material is carried from the cap toward the trailing edge, the canals are grooves connecting the main stem passages, and the subsidiary stem passages are escape grooves connecting the canals. The cap is that portion of a shuttlecock normally struck by a racket, and the skirt is the vane portion of the shuttlecock.

The grooves are cut in the male or female mold sections or both, along which molding material or air may flow. After the flow of material has ceased, the material sets in the grooves in the form of a plastic shuttlecock, and provided care is taken not to machine the grooves at such an angle that the molded shuttlecock would be locked to the mold section provided with the canals, the shuttlecock after setting may be removed as a complete unit. Some license is permissible in this respect if the material used is flexible when set, but in any case a lead must be provided which will ease the shuttlecock from the canal grooves when it is being removed. This objective should be achieved if the canals in the male mold section are machined without a step in the side of the canals nearest the cap, and the canals in the female section are machined without a step in the side of the canals farthest from the cap. In practice, if the canal groove is machined on a lathe by moving the cutter into the male or female mold section along the length of the lathe as distinct from across the bed of the lathe, the desired condition would be obtained.

Figure 3:
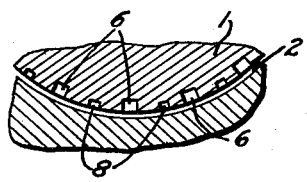
Fig. 3 is an enlarged fragmentary transverse section through the assembled mold sections of Fig. 1.
Figure 2:
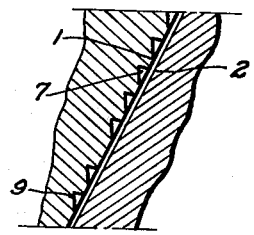
Fig. 2 is an enlarged fragmentary section taken between and lengthwise of adjacent main stem passages of the assembled mold sections.
Figure 5:
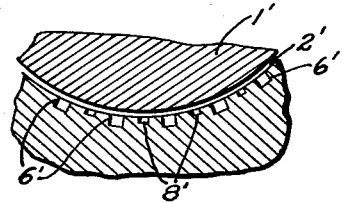
Fig. 5 is a view similar to Fig. 3 of the form of the invention shown in Fig. 4.
Figure 1:
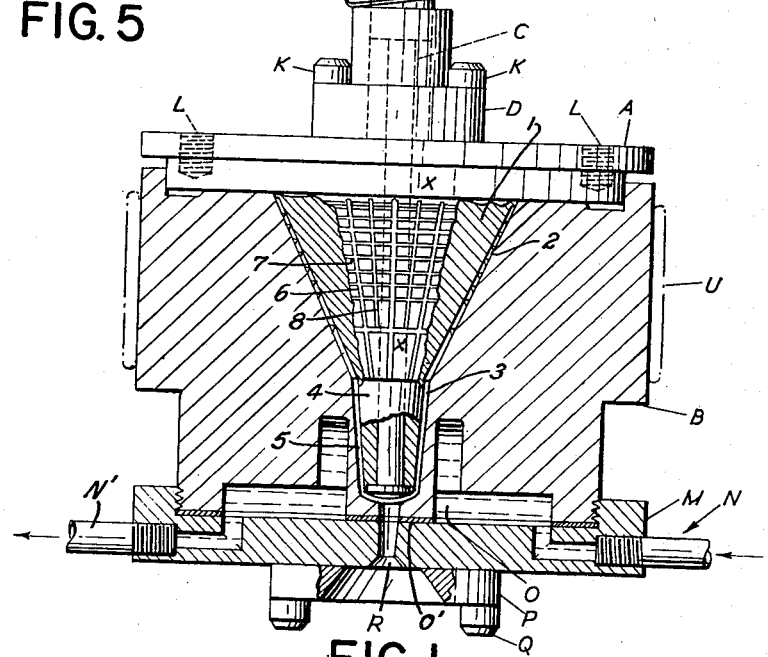
Fig. 1 is a sectional elevation of a molding apparatus in accordance with this invention, the section being taken through two of the main stem passages of the male mold section.

Referring to the drawings in detail, A and B respectively designate the male and female sections of a two part mold, the part A being provided with threaded sockets L for bolted connection with the tailstock mold plate of an injection molding machine, and the part B having a head plate M in threaded engagement therewith for connection with the headstock mold plate of the machine. A nozzle plate P is secured to the plate M by means of fastener elements Q, and an inlet passage R extends through the plate M whereby communication is established between the interior of the nozzle plate P and the interior of the female mold section B. Through pipes N and N', water may be circulated through a cavity O disposed between the mold section B and plate M, which water is prevented from entering the inlet passage R by suitable packing O'. A heating element U is disposed in contact with the outer surface of the mold section B.

Extending through the mold section A is an ejector C which is connected to a ram E and urged inwardly with respect to the mold section A by means of a spring F having its ends abutting a retaining plate G and an ejector guide D secured to the section A by means of suitable fasteners K. The retaining plate G is secured to the ram E by means of a bolt J provided with a washer H. The foregoing elements pertain to a conventional injection molding machine, and form no part of the present invention.

The male mold section A includes a conical projection 1 adapted to closely fit within a conical socket 2 in the female mold section B, the latter further having a slightly tapered well 3 extending from the bottom of the socket 2, and having its lower end in communication with the inlet passage R. The conical projection 1 terminates in a cap portion 4 extending into the well 3, the portion 4 having a taper corresponding to that of the well 3, and being spaced from the wall thereof so as to provide an annular space 5.

Formed in the outer face of the conical projection 1 are a plurality of main stem passages 6 extending from the space 5 lengthwise of the projection 1. The passages 6 are connected by a series of rib passages or canals 7 extending circumferentially of the projection 1. Extending lengthwise of the projection 1, and transversely of the canals 7, are a plurality of subsidiary stem passages 8, at least one of the passages 8 being provided between each adjacent pair of the main stem passages 6. The passages 8 extend from the canal nearest the cap portion 4 to the one farthest therefrom.

The material is forced under pressure in a fluid state through the inlet R, and runs around the space 5 left for the cap of the shuttlecock into the stem passages 6, then into the canals 7 and thence into the subsidiary stem passages 8. If the subsidiary stem passages were not provided it would be necessary to leave an air space between the mold sections or alternatively make the canals greater in cross-sectional area than is desirable in the skirt of a shuttlecock in order to obtain a substantially free and unobstructed flow of the material through the canals.

The canals 7 are machined to a depth from the surface of the male mold section of about .010" if polythene is the material being used. If nylon is the material it will not stretch as readily as materials like polythene and particular attention should be paid to avoid locking the ribs of the molded shuttlecock to the mold section having the canals.

In order to facilitate removal of a molded shuttlecock from the apparatus, the canals are machined in a substantially triangular shape in cross-section with the sides 9 nearest the cap portion 4 being disposed substantially parallel to the longitudinal axis of the mold section A, whereby each of such sides is substantially free from any structure in the nature of a step having a tendency to obstruct the removal of the mold section A from the molded ribs formed in the canals upon relative axial movement of the mold section A and the molded shuttlecock. In practice, if the canal groove is machined on a lathe by moving the cutter into the mold section in a direction lengthwise of the lathe, the desired cross-sectional configuration of the canal would be obtained.

It will be understood that the main stem passages, canals and subsidiary stem passages could be formed in the female mold section, or both the male and female mold sections. Also it will be understood that suitable materials other than polythene and nylon may be used, and more than one subsidiary stem passage may be provided between each adjacent pair of main stem passages. In practice, this may be desirable because of the filling up effect thus given to the skirt.

The main stem passages 6 should be .07" deep and about the same width at the cap end and taper to about .010" at the trailing edge. The subsidiary stem passages 8 should be about .008" deep and wide but these dimensions are given as an indication and not as a limitation.

The temperature of the skirt portion of the mold is satisfactory at 40 degrees C.

In the method of shuttlecock manufacture described herewith the indications are that pressures higher than normal are required, particularly when the molds are new.

Figure 4:
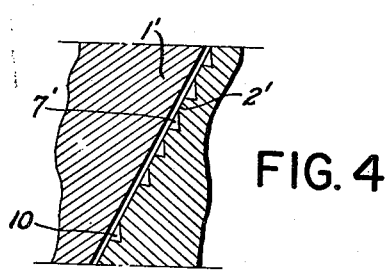
Fig. 4 is a view similar to Fig. 2 showing a modified form of my invention.

Fig. 4 illustrates the manner in which the canals are formed in an embodiment of the invention wherein the grooves are provided in the female mold section designated 2' instead of in the male mold section designated 1'. In this embodiment, the canals are designated 7', and the sides 10 thereof farthest from the well 3 are disposed substantially parallel to the longitudinal axis of the female mold section whereby each of such sides is substantially free from any structure in the nature of a step having a tendency to obstruct the removal of the female mold section from the molded ribs formed in the canals upon relative axial movement of the female mold section and the molded shuttlecock. The grooves 7' may be machined on a lathe in the same manner as the grooves 7 previously described.

With the canal grooves formed in the mold section A, an uninterrupted surface is presented to the molded shuttlecock by the mold section B, and when the canal grooves are formed in the mold section B, the uninterrupted surface is presented by the mold section A. In the event the grooves should be formed in both mold sections, the side of the canal grooves nearest the cap in the male mold section, and farthest from the well in the female mold section should be disposed substantially parallel to the longitudinal axis of the mold to facilitate removal of the molded shuttlecock.

Having now particularly described and ascertained the nature of my said invention and in what manner the same is to be performed, I declare that what I claim is:

1. Apparatus for the injection molding of plastic shuttlecocks comprising, a female mold section having a conical cavity terminating at its smaller end in a well, means operatively connecting said female mold section with an injection nozzle, a male mold section movably mounted with respect to the female mold section and having a conical projection closely fitting within said cavity and further having a cap portion extending from said conical projection into said well in spaced relation to the walls thereof to provide an annular space, at least one of said mold sections having spaced main stem passages in its closely fitting conical face extending lengthwise thereof from said annular space, at least one of said mold sections further having in its closely fitting conical face spaced rib passages extending circumferentially thereof and in communication with said main stem passages, at least one of said mold sections further having in its closely fitting conical face between each adjacent pair of said main stem passages a subsidiary stem passage extending lengthwise thereof, said subsidiary stem passages being in communication with said rib passages.

2. Apparatus for the injection molding of plastic shuttlecocks comprising, a female mold section having a conical cavity terminating at its smaller end in a well, means operatively connecting said female mold section with an injection nozzle in communication with said well, a male mold section movably mounted with respect to the female mold section and having a conical projection closely fitting within said cavity and further having a cap portion extending from said conical projection into said well in spaced relation to the walls thereof to provide an annular space, said male mold section having spaced stem passages in its conical face extending lengthwise thereof from said annular space, said male mold section further having in its conical face spaced rib passages extending circumferentially thereof and in communication with said stem passages, said rib passages being substantially triangular in cross-sectional shape and each having its side nearest said annular space disposed substantially parallel to the longitudinal axis of the mold sections, and an ejector mounted on the male mold section.

3. Apparatus for the injection molding of plastic shuttlecocks comprising, a female mold section having a conical cavity terminating at its smaller end in a well, means operatively connecting said female mold section with an injection nozzle in communication with said well, a male mold section movably mounted with respect to the female mold section and having a conical projection closely fitting within said cavity and further having a cap portion extending from said conical projection into said well in spaced relation to the walls thereof to provide an annular space, said male mold section having spaced stem passages in its conical face extending lengthwise thereof from said annular space, said male mold section further having in its conical face spaced rib passages extending circumferentially thereof and in communication with said stem passages, each of said rib passages having a substantially straight side nearest said annular space disposed substantially parallel to the longitudinal axis of the mold sections, and an ejector mounted on the male mold section.

4. Apparatus for the injection molding of plastic shuttlecocks comprising, a female mold section having a conical cavity terminating at its smaller end in a well, means operatively connecting said female mold section with an injection nozzle in communication with said well, and a male mold section movably mounted with respect to the female mold section and having a conical projection closely fitting within said cavity and further having a cap portion extending from said conical projection into said well in spaced relation to the walls thereof to provide an annular space, said female mold section having spaced stem passages in its conical face extending lengthwise thereof from said annular space, said female mold section further having in its conical face spaced rib passages extending circumferentially thereof and in communication with said stem passages, said rib passages being substantially triangular in cross-sectional shape and each having its side farthest from said annular space disposed substantially parallel to the longitudinal axis of the mold sections.

5. Apparatus for the injection molding of plastic shuttlecocks comprising, a female mold section having a conical cavity terminating at its smaller end in a well, means operatively connecting said female mold section with an injection nozzle in communication with said well, and a male mold section movably mounted with respect to the female mold section and having a conical projection closely fitting within said cavity and further having a cap portion extending from said conical projection into said well in spaced relation to the walls thereof to provide an annular space, said female mold section having spaced stem passages in its conical face extending lengthwise thereof from said annular space, said female mold section further having in its conical face spaced rib passages extending circumferentially thereof and in communication with said stem passages, each of said rib passages having a substantially straight side farthest from said annular space disposed substantially parallel to the longitudinal axis of the mold sections.

6. Apparatus for the injection molding of plastic shuttlecocks comprising a female mold section having a conical cavity, a male mold section movably mounted with respect to the female mold section and having a conical projection closely fitting within said cavity, at least one of said mold sections being recessed at its small end to provide an annular space for operative connection with an injection nozzle, at least one of said mold sections having spaced main passages extending lengthwise thereof from said annular space, at least one of said mold sections further having spaced rib passages extending circumferentially thereof, and at least one of said mold sections further having a longitudinally extending subsidiary stem passage between each adjacent pair of main stem passages when the mold sections are in assembled relation, said main and subsidiary stem passages being in communication with said rib passages when the mold sections are in assembled relation.

7. Apparatus for the injection molding of plastic shuttlecocks comprising male and female mold sections mated in the normal manner for injection molding and incorporating main stem passages extending lengthwise of the mold and rib passages extending circumferentially of the mold in communication with said main stem passages, said mated mold sections being characterized by being provided with at least one longitudinally extending subsidiary stem passage between each adjacent pair of main stem passages, said subsidiary stem passage being in communication with at least one rib passage.

WILLIAM CHARLES CARLTON.

References Cited in the file of this patent

UNITED STATES PATENTS

| Number | Name | Date |
|---|---|---|
| 2,100,985 | Smally | Nov. 30, 1937 |
| 2,396,406 | Anderson | Mar. 12, 1946 |
| 2,524,858 | Thomas | Oct. 10, 1950 |